United States Patent [19]

Darnell et al.

[11] Patent Number: 4,861,856

[45] Date of Patent: Aug. 29, 1989

[54] PROCESS FOR THE PREPARATION OF POLYKETONE AND POLY(KETONE-SULFONE) POLYMERS

[75] Inventors: W. Ronald Darnell, Weber City, Va.; Winston J. Jackson, Jr., Kingsport, Tenn.

[73] Assignee: Eastman Kodak Company, Rochester, N.Y.

[21] Appl. No.: 240,642

[22] Filed: Sep. 6, 1988

[51] Int. Cl.$^4$ ............................................. C08G 67/00
[52] U.S. Cl. .................................... 528/125; 528/126; 528/128; 528/173; 528/176; 528/179; 528/190; 528/191; 528/193; 528/206; 528/207; 528/220; 528/364
[58] Field of Search ............... 528/125, 126, 128, 173, 528/176, 179, 190, 191, 193, 206, 207, 220, 364

[56] References Cited

U.S. PATENT DOCUMENTS 4,396,755  8/1983  Rose ..................... 528/126

FOREIGN PATENT DOCUMENTS 0075390  3/1983  European Pat. Off. .
241306  10/1987  European Pat. Off. .
2099006  4/1982  United Kingdom .

Primary Examiner—Harold D. Anderson
Assistant Examiner—T. Mason
Attorney, Agent, or Firm—J. Frederick Thomsen; William P. Heath, Jr.

[57] ABSTRACT

Disclosed is an improved process for the preparation of polyketone and poly(ketone-sulfone) polymers by the reaction of at least one dicarboxylic acid with certain aromatic compounds containing at least four benzene residues in the presence of a perfluoroalkylsulfonic acid and (1) an oxide of phosphorus and/or (2) a perhaloalkanoic anhydride.

9 Claims, No Drawings

PROCESS FOR THE PREPARATION OF POLYKETONE AND POLY(KETONE-SULFONE) POLYMERS

TECHNICAL FIELD

This invention relates to a novel process for the preparation of polymeric ketones and ketone-sulfones and more specifically, to a process for preparing high molecular weight polyketone and poly(ketone-sulfone) polymers from at least one dicarboxylic acid and certain aromatic compounds containing at least four benzene residues in the presence of a perfluoroalkanesulfonic acid and an oxide of phosphorus and/or a perhaloalkanoic anhydride. The polymers produced according to this invention are useful as molding plastics, coatings, films, fibers, matrix resins, etc.

BACKGROUND OF THE INVENTION

British Pat. No. 2,116,990 (also U.S. Defensive Publication T103,703) to ICI and H. M. Colquhoun, *Polymer Preprints* 25 (2), 17–18 (1984), disclose a process for the preparation of poly(ether ketones) (a) from dicarboxylic acids and aromatic compounds, (b) from monocarboxylic acids or (c) from a mixture of (a) and (b). The process disclosed in these references (1) does not utilize an oxide of phosphorus and/or a perhaloalkanoic anhydride in any way, (2) is limited to special 'activated' dicarboxylic acids, monocarboxylic acids, and aromatic compounds, and (3) does not include such common dicarboxylic acids as terephthalic and isophthalic acids and such aromatic compounds as diphenyl ether or biphenyl (see page 2, lines 55–67, of the British patent). In Example 6 of the British patent, an attempt is made to prepare a poly(ether-ketone) by reacting terephthalic acid and p-diphenoxybenzene in only trifluoromethanesulfonic acid at ambient temperature for 48 hours. No increase in solution viscosity was observed. Subsequently, the mixture was heated to 90° C. for 5 hours with only a slight increase in solution viscosity apparent. The Colquhoun reference paper states, in Column 2 of page 17, that "Terephthalic acid, for example, fails to react at all with aryl ethers in $CF_3SO_3H$, ..."

U.S. Pat. No. 4,396,755 discloses a process which involves the polymerization of (a) a dicarboxylic acid(s) with an aromatic compound(s), (b) a self-polymerizable aromatic monocarboxylic acid, or (c) a mixture of (a) and (b) in the presence of a fluoroalkanesulfonic acid and a quinquevalent phosphorus halide, such as $PCl_5$. According to Column 2, lines 20–21, "presumably, the reaction proceeds via the in situ formation of mono or diacyl halide." (Di)carboxylic acid halide(s) are well known intermediates for the preparation of polyketones (see U.S. Pat. No. 4,398,020).

British Pat. No. 2,099,006 discloses a process for the preparation in trifluoromethanesulfonic acid of poly(ether ketones) from monocarboxylic acid chlorides (such as 4-phenoxybenzoyl chloride) in which $P_2O_5$ and water may, if desired, be added to the polymerization reactor in order to produce phosphoric acid (to act as a solvent) (see lines 27–41 on page 1 and lines 1–8 and 17–20 on page 2). In this case, however, only the acid chlorides, which are appreciably more reactive than the carboxylic acids, are disclosed. The use of monocarboxylic or dicarboxylic acids is not disclosed.

European Patent Application No. 75,390 discloses the acylation of aromatic compounds to produce "arylophenones" by the reaction of an aromatic carboxylic acid with an aromatic compound in the presence of a fluoroalkanesulfonic acid. This reference does not disclose either the preparation of high molecular weight poly(ether ketones) or the use of a phosphorus compound and/or a perhaloalkanoic anhydride in combination with a perfluoroalkanesulfonic acid.

European Patent Application No. 241,306 discloses the synthesis of polyaryletherketone by Friedel-Crafts chemistry using a catalytic quantity of a strong acid, such as trifluoromethanesulfonic acid, in a solvent of lower acidity preferably comprising a second acid of strength at least equal to chloroacetic acid. This reference neither discloses nor contemplates the preparation of polyketones or poly(ketone-sulfones) from dicarboxylic acids and the aromatic compounds described hereinbelow. The reference also fails to disclose the preparation of a poly(ether-ketone) from dicarboxylic acids in which the reaction solvent is a perfluoroalkanesulfonic acid containing a phosphorus oxide and/or perhaloalkanoic anhydride.

DISCLOSURE OF THE INVENTION

According to the process provided by our invention, high molecular weight polyketones and poly(ketone-sulfones) are prepared by reacting one or more dicarboxylic acids with one or more aromatic compounds containing at least four benzene residues in the presence of a perfluoroalkylsulfonic acid(s) and (1) an oxide of phosphorus and/or (2) a perhaloalkanoic anhydride.

The polymerization occurs as HOH is formed by the elimination of an OH group from a carboxylic acid and an H from hydrogen attached to an aromatic ring, the polymer chain becoming linked together between a carbonyl group and an aromatic ring.

The aromatic dicarboxylic acids which are useful in the process of the invention may contain 8 to 30 carbon atoms and include all of those disclosed in British Pat. No. 2,116,990 incorporated herein by reference. Additionally, other aromatic dicarboxylic acids which are not disclosed in British Pat. No. 2,116,990 are also useful in the process of the invention. Such dicarboxylic acids include those having the general formula HOOC—$Ar^1$—COOH, where —$Ar^1$— is phenylene, naphthylene, or biphenylene and each —COOH is an aromatically bound carboxyl group separated from the other —COOH group by at least 3 carbon atoms. Although the arylene residues represented by —$Ar^1$— preferably are unsubstituted, they may be substituted with alkyl or alkoxy or with Cl or Br atoms. Examples of dicarboxylic acids which can be used include terephthalic acid, chloroterephthalic acid, 5-methylisophthalic acid, isophthalic acid, 4,4'-oxydibenzoic acid, 3,4'-, 3,3'-, and 4,4'-biphenyldicarboxylic acids, and 1,3'-, 1,4-, 1,5-, 1,6-, 1,7-, 2,5-, 2,6-, and 2,7-naphthalenedicarboxylic acids.

Aliphatic and cycloaliphatic dicarboxylic acids containing 6 to 20 carbon atoms are also useful in the process of the invention, but aromatic dicarboxylic acids are preferred because more oxidatively and thermally stable polymers are obtained with the aromatic acids. For aliphatic dicarboxylic acids, the carboxyl groups should be separated from each other by at least 4 carbon atoms. For cycloaliphatic dicarboxylic acids, the carboxyl groups should be attached directly to the cyclic ring and should be separated from each other by at least 3 carbon atoms. These aliphatic and cycloaliphatic dicarboxylic acids include adipic acid, azelaic acid, sebacic acid, 1,3-cyclohexane dicarboxylic acid (cis and/or trans isomers), and 1,4-cyclohexanedicarboxylic acid (cis and/or trans isomers).

The aromatic compounds employed in the process of this invention contain at least four benzene residues (at least 24 carbon atoms) and have the formula

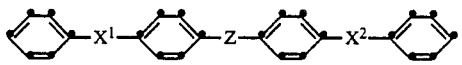

wherein $X^1$ and $X^2$ are independently selected from a direct bond, —O—, —S— or groups having the formula

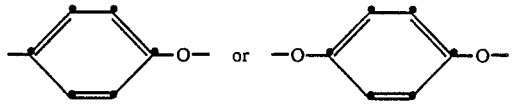

and Z is

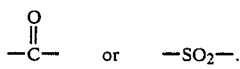

Specific examples of the aromatic compounds include 4-phenoxyphenyl sulfone, 4,4'-diphenoxybenzophenone, 4-biphenylyl ketone, 4-biphenylyl sulfone, 4,4'-phenoxybiphenyl 4-phenylthiophenyl sulfone, etc. The upper limit on the carbon content of the aromatic compound is about 37 carbon atoms. The above described aromatic compounds typically will constitute at least 80, and preferably 90, mole percent of the aromatic compound reactant employed in the process of our invention.

If desired, minor amounts, e.g., up to about 20 mol percent, of other aromatic compounds can be included in the novel process described hereinabove. Such other aromatic compounds may contain 10 to 32 carbon atoms and include those disclosed in British Pat. No. 2,116,990 and U.S. Pat. No. 4,611,033, also incorporated herein by reference, plus other compounds having the general formulae H—Ar$^1$—X$^1$—Ar$^1$—H or H—R$^1$—H, where Ar$^1$ is defined above, H is an aromatically bound hydrogen atom and —R$^1$— is the divalent residue of a polynuclear hydrocarbon containing at least 10 carbon atoms, and —X$^1$— is defined hereinabove. Examples of such aromatic compounds include diphenyl ether, diphenyl sulfide, biphenyl, naphthalene, anthracene, and phenanthrene.

The process of the invention is carried out in a perfluoroalkylsulfonic acid(s) containing from 1-4 carbon atoms in an amount sufficient to act as a process solvent for the reactants and the poly(ether-ketone) product. The amount of perfluoroalkane sulfonic acid normally should be at least three times the theoretical weight of polyketone or poly(ketone-sulfone) product. The upper limit of the amount of perfluoroalkanesulfonic acid is not important to the operation of the process and is determined only by the practicality of recovering the expensive acid for recycle. Trifluoromethanesulfonic acid is preferred because of its commercial availability. The perfluoroalkylsulfonic acid is preferably essentially anhydrous, but small amounts of water can be tolerated. The process provided by our invention preferably is performed in the presence of trifluoromethanesulfonic acid in an amount which is about four to nine times the theoretical weight of the polymeric product obtainable from the process.

The oxides of phosphorus which may be used in the process of the invention include all of those compounds which contain at least one —P—O—P— unit, such as phosphorus oxides and polyphosphoric acid. The phosphorus oxides inlcude phosphorus trioxide and phosphorus pentoxide. Phosphorus pentoxide ($P_2O_5$ or $P_4O_{10}$) is the preferred oxide of phosphorus. Polyphosphoric acid is known to be a mixture of compounds having the structure

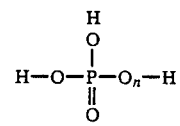

in which "n" is equal to or greater than 2. Examples of polyphosphoric acids include pyrophosphoric acid (n=2), tripolyphosphoric acid (n=3), tetrapolyphosphoric acid (n=4), etc. Cyclic structures are possible in the polyphosphoric acid structure. The polyphosphoric acid may be prepared from orthophosphoric acid and phosphorus pentoxide by well known procedures or it may be obtained commercially.

The perhaloalkanoic anhydrides which may be used, either alone or in combination with one or more of the oxides of phosphorus described hereinabove, can contain up to about 8 carbon atoms. The perhaloalkanoic anhydrides preferably are perchloro- or perfluoroalkanoic anhydrides, especially perchloroacetic and perfluoracetic anhydrides, because of their availability. The perhaloalkanoic anhydrides may be employed in our novel process at temperatures in the range of 0° to 100° C. or higher depending on the boiling point of the particular anhydrides and apparatus used and the reactivity of the anhydride or by-product said with the reactants. However, when a perhaloalkanoic anhydride is used, the process normally will be conducted at a temperature in the range of about 23° to 75° C.

The amount of oxide(s) of phosphorus and/or perhaloalkanoic anhydride should be chosen so that the gram moles of —P—O—P— unit and/or perhaloalkanoic anhydride otals at least two per gram mole of dicarboxylic acid(s) used in the reaction. Thus, in the case of the preferred phosphorus pentoxide, at least 0.67 gram mole ($P_2O_5$) per gram mole of dicarboxylic acid is required since one mole of $P_2O_5$ will react with three moles of water. Similarly, when using a perhaloalkanoic anhydride without an oxide of phosphorus, at least two gram-moles of anhydride per gram mole of dicarboxylic acid should be used. It is advantageous to utilize an excess of at least 10% of the phosphorus pentoxide and/or perhaloalkanoic anhydride to offset trace amounts of water present in the reactants and in or on the apparatus used in conducting the process. Faster rates of polymerization are achieved when more oxide of phosphorus and/or anhydride is used, but problems of varying severity with undissolved or poorly dispersed starting materials and/or problems with control of temperature and molecular weight may be encountered, depending on the particular dicarboxylic acid and aromatic compound being used. The use of a total of 7.0 gram moles of —P—O—P— unit and/or gram moles of perhaloalkanoic anhydride per gram mole of dicarboxylic acid(s) being utilized in the process normally gives good results although total amounts of 14 to 16 or more gram moles of —P—O—P— unit and/or anhydride per gram mole of dicarboxylic acid may be used to prepare some polyketone or poly(ketone sulfone) compositions. Our process preferably is carried out in the presence of an oxide of phosphorus, most preferably without using a perhaloalkanoic anhydride.

The reaction may be carried out at 0° to 100° C., but temperatures up to 150° C. may be used with some reactants. The higher polymerization temperatures give faster polymerization rates but increase the probability of undesirable side reactions, such as fluoroalkylsulfonation of aromatic moieties, branching of the polyketone and/or poly(ketone-sulfone), and/or problems of reactor temperature control because of the exothermicity of the reaction. A temperature of about 10°–40° C. is preferred. Although the process normally is conducted at atmospheric pressure, reduced pressures may be used so long as nothing volatilizes from the reaction mixture, and increased pressures up to 3000 psi or more may be used.

The time of the polymerization may vary from a few minutes to several days, depending on the structure of the starting materials, the temperature, the amount of perfluoroalkylsulfonic acid, and the amount of the oxide of phosphorus and/or perhaloalkanoic anhydride used. The optimum conditions for the preparation of the polyketones and poly(ketone-sulfones) by the process of the invention should be determined experimentally for the desired composition in order to prepare the desired molecular weight.

The poly(ether ketones) obtainable from the process provided by our invention contain at least 80 mole percent, preferably at least 90 mole percent, of monomer units of the formulas

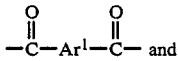

and

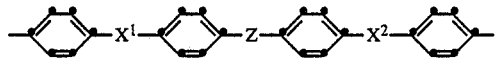

with the remainder of the polymer made up primarily or entirely of monomer units having the formulas —Ar$^1$—X—Ar$^1$— and/or —R$^1$— wherein Ar$^1$, R$^1$, X$^1$ and X$^2$ are described hereinabove. The most preferred polymers prepared according to the process consist essentially of the residues of an aromatic dicarboxylic acid, especially those wherein Ar$^1$ is 1,3- or 1,4-phenylene, and 4-phenoxyphenyl sulfone, 4,4'-diphenoxybenzophenone and 4-biphenylyl sulfone. Very high molecular weight polymers, e.g. having an inherent viscosity of 2.0 or more may be prepared by the process of the invention. The preferred polyketones and poly(ketone sulfones) obtainable from the process of the invention have an inherent viscosity of from about 0.6 to 1.8. The especially preferred polyketones and poly(ketone sulfones) which can be prepared by the process of the invention have an inherent viscosity in the range of about 0.7 to 1.5. Such polymers are useful because of their excellent thermal, oxidative, and hydrolytic stability and their excellent solvent and chemical resistance.

The molecular weight of the polymers prepared by the process of the invention may be controlled by adding an excess of one of the starting materials, preferably one of the aromatic compounds described hereinabove, or by the addition of suitable end-capping species, which also may improve the thermal stability of the polymer product. Benzoic acid or biphenyl may be used for this purpose. Preferably, the end-capping component is the aromatic compound containing at least 24 carbon atoms used in the polymerization. In addition to controlling the molecular weight of the polyketones and poly(ketone-sulfone), an excess of the aromatic compound also aids in the control of polymer branching. In a preferred embodiment of the process of the invention, at least 2 mole percent excess of the aromatic compound is used to control branching in the polymer product.

The process of the invention may be carried out (1) by adding the perfluoroalkylsulfonic acid to the reactants and then adding the oxide(s) of phosphorus and/or perhaloalkanoic anhydride, (2) by predissolving or mixing the oxide(s) of phosphorus and/or anhydride in the perfluoroalkylsulfonic acid at ambient or somewhat elevated temperature and then adding the reactants, (3) by first adding the perfluoroalkylsulfonic acid to the polymerization vessel followed by addition of the reactants individually, or (4) by essentially simultaneous addition of all of the starting materials to the polymerization reactor. Also, the reaction may be carried out in a stepwise manner, such as by reacting the dicarboxylic acid(s) with only a portion of the aromatic compound to prepare an oligomer which can be subsequently reacted with the remainder of the aromatic compound and, optionally, one of the self-polymerizable monocarboxylic acids, to form a high molecular weight polymer. Similarly, the aromatic compound may be reacted with a portion of the dicarboxylic acid(s) followed by further reaction with the remainder of the dicarboxylic acid(s). It may be advantageous to predissolve one or more of the reactants in the perfluoroalkylsulfonic acid and then add the oxide(s) of phosphorus and/or perhaloalkanoic anhydride to effect the polymerization. Alternatively, to avoid the formation of 'lumps', it may be advantageous first to add the perfluoroalkylsulfonic acid to the polymerization vessel, begin stirring the reactor contents at a moderate rate, and then add the other polymerization ingredients. For larger batches, the perfluoroalkylsulfonic acid may be placed into the reaction vessel first and then the other materials may be added—the dicarboxylic acid, perhaloalkanoic anhydride or oxide of phosphorus being added last, in increments if necessary to control the exothermicity of the polymerization. This latter process is generally preferred.

The polyketones and poly(ketone sulfones) prepared by the process of the invention may be isolated by drowning the reaction mixture in water to precipitate the polymer product followed by extraction with boiling water and/or an organic liquid such as acetone.

Our novel process is further illustrated by the following examples. The inherent viscosity (I.V.) specified in the examples and in the preceding description are determined at 25° C. in 98% sulfuric acid at a concentration of 0.25 g polymer per 100 mL. The films are pressed in a Hannifin press at 375° C. and the differential scanning calorimetry (endotherm peaks and Tg's) are obtained using a Perkin Elmer Differential Scanning Calorimeter, Model DSC-2, at a scan rate of 20° C. minute. The apparatus used consists of a 50 mL, 3-necked flask equipped with a stirrer consisting of a glass shaft and a Teflon fluoropolymer blade, a nitrogen inlet, a thermometer, an outlet port and an electric stirring motor. The flask and stirrer are dried in a forced air oven at 110° C. for 15 minutes immediately prior to use. The flask is placed in a chilled water bath and filled with nitrogen.

EXAMPLE 1

To the cooled (16° C.) agitated flask are added in order:
Trifluoromethanesulfonic acid, 28 mL,
Terephthalic acid, 1.66 g, 0.01 mole,
4-Phenoxyphenyl sulfone, 4.18 g. 0.0104 mole, 0.01 mole assuming a molecular weight of 476 due to the presence of 1.9% oligomeric material, and
Phosphorus pentoxide, 2.84 g, 0.02 mole.

The cooling bath is removed and the stirred at about 23° C. for six hours. At this time, the polymerization mixture is red-amber and the viscosity has increased to a high level. The reaction is stopped and the poly(ether ketone) product is precipitated by slowly adding the reaction mixture to water in a Waring blender. The fibrous, light yellow poly(ketone sulfone) is purified by rinsing three times with deionized water in the Waring blender, refluxing in acetone overnight and vacuum drying at 120° C. overnight. The off-white, fibrous polymer has an I.V. of 1.02 and a film pressed from the polymer at 320° C. is light amber and very tough. The poly(ketone sulfone) has a DSC endotherm at 214° C. and a Tg at 196° C.

When Example 1 is repeated in the absence of phosphorus pentoxide, there is no apparent increase in the viscosity of the polymerization mixture, even after stirring for 168 hours.

EXAMPLE 2

Example 1 is repeated in the absence of phosphorus pentoxide but with the addition of trifluoroacetic anhydride (12.6 g, 0.06 mole) after the trifluoromethane sulfonic acid is added. The resulting polymerization mixture is stirred at 50° C. for 1.5 hours at which time the viscosity of the mixture had increased to a degree that the mixture wound up on the stirrer shaft rotating at a slow rate. The poly(ketone sulfone) product is isolated, purified and dried as described in Example 1. The I.V. of the fibrous, off-white product is 2.88. A film pressed of the poly(ketone sulfone) at 320° C. is very tough.

EXAMPLE 3

To the stirred flask are added at a temperature over the range of about 18° to 21° C. in order:
Trifluoromethanesulfonic acid, 26 mL, and
4-Biphenylyl Sulfone, 3.85 g, 0.0104 mole.

The polymerization mixture is heated with stirring to 50° C. for 10 minutes to obtain a uniform solution. The mixture then is cooled to 30° C. and terephthalic acid (1.66 g, 0.01 mole) is added and stirring is continued for 10 minutes to obtain a uniform solution. The mixture then is cooled to 18° C. and phosphorus pentoxide (2.84 g, 0.02 mole) is added. After stirring for 10 minutes, the cooling bath is removed and the polymerization mixture is stirred at 25° C. for 22 hours. At this time, the viscosity has increased to a medium high level. The poly(ketone sulfone) product thus produced is isolated, purified and dried as described in Example 1. The fibrous, light yellow product has an I.V. of 1.21 and gives a tough film when pressed at 440° C.

EXAMPLE 4

Substituting 4,4′-diphenoxybenzophenone (3.81 g, 0.0104 mole) for the 4-phenoxy phenyl sulfone, the same materials and amounts used in Example 1 are added to the flask. The contents of the flask are then stirred at 23° C. for 8.5 hours to obtain a dark red-amber mixture which winds up on the stirrer shaft rotating at a slow rate. The polyketone is precipitated, purified and vacuum dried as described in Example 1. The off white, fibrous product has an I.V. of 1.17 and gives a tough film pressed at 390° C.

The invention has been described in detail with particular reference to preferred embodiments thereof, but it will be understood that variations and modifications will be effected within the spirit and scope of the invention.

We claim:

1. Process for the preparation of a polyketone or poly(ketone-sulfone) containing at least 50 mole percent of monomer segments derived from an aromatic diacarboxylic acid and an aromatic compound, which comprises reacting at a temperature of about 0° to 150° C. until the desired degree of polymerization is achieved an aromatic dicarboxylic acid and an aromatic compound having the formula

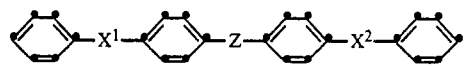

wherein $X^1$ and $X^2$ represent direct bonds or $X^1$ and $X^2$ are independently selected from a direct bond, —O—, —S— or groups having the formula

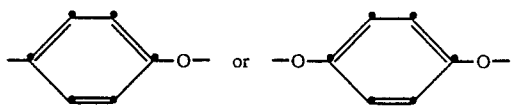

and Z is

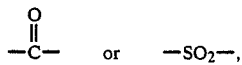

in the presence of a perfluoroalkanesulfonic acid in an amount wich is at least three times the theoretical amount of poly(ether-ketone) product and (1) an oxide of phosphorus, (2) a perhaloalkanoic anhydride or (3) a mixture of (1) and (2) in an amount of at least a total of two gram-moles of —P—O—P— unit and/or gram-moles of perhaloalkanoic anhydride per gram-mole of dicarboxylic acid reactant.

2. Process according to claim 1 wherein the aromatic dicarboxylic acid has the formula HOOC—Ar$^1$—COOH wherein Ar$^1$ is phenylene, naphthylene or biphenylene and each —COOH is an aromatically bound carboxyl separated from the other —COOH group by at least three carbon atoms.

3. Process according to claim 2 wherein the polyketone or poly(ketone-sulfone) product has an inherent viscosity of about 0.6 to 1.8, determined at 25° C. in 98% sulfuric acid at a concentration of 0.25 g polymer per 100 mL, and the process is performed at a temperature of about 10° to 40° C.

4. Process for the preparation of a polyketone or poly(ketone-sulfone) containing at least 80 mole percent of monomer segments derived from one or more aromatic dicarboxylic acids and an aromatic compound, which comprises reacting at a temperature of about 10° to 40° C., until a polyketone or poly(ketone-sulfone) having an inherent viscosity of about 0.7 to 1.5, determined at 25° C. in 98% sulfuric acid at a concentration of 0.25 g polymer per 100 mL, is obtained, one or more dicarboxylic acids having the formula HOOC—Ar$^1$—COOH with an aromatic compound having the formula

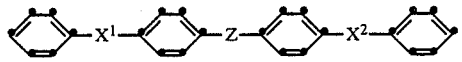

in the presence of trifluoromethanesulfonic acid in an amount which is about four to nine times the theoretical weight of the poly(ether-ketone) product and an oxide of phosphorus in an amount of at least two gram-mole of —P—O—P— per gram-mole of dicarboxylic acid reactant; wherein Ar$^1$ is phenylene, naphthylene or biphenylene and each —COOH is an aromatically bound carboxyl separated from the other —COOH by at least three carbon atoms, X$^1$ and X$^2$ are independently selected from a direct bond, —O—, —S— or groups having the formula

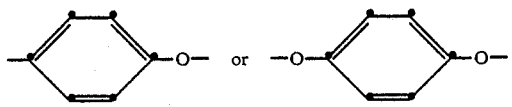

and Z is

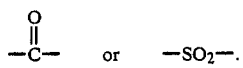

5. Process according to claim 4 wherein the polyketone or poly(ketone-sulfone) optionally contains monomer segments derived form an aromatic compound having the formula H—Ar$^1$—X$^1$—Ar$^1$—H or H—R$^1$—H wherein Ar$^1$ is defined in claim 4, H is an aromatically bound hydrogen atom and R$^1$ is the divalent residue of a polynuclear hydrocarbon containing at least 10 carbon atoms.

6. Process for the preparation of a polyketone or poly(ketone-sulfone) containing at least 80 mole percent of monomer segments derived from an aromatic dicarboxylic acid selected from isophthalic, terephthalic and 2,6-napthalenedicarboxylic acids and an aromatic compound selected from 4-phenoxyphenyl sulfone, 4,4'-phenoxybenzophenone or 4-biphenylyl sulfone, which comprises reacting at a temperature of about 10° to 40° C. until a polyketone or poly(ketone-sulfone) having an inherent viscosity of about 0.7 to 1.5, determined at 25° C. in 98% sulfuric acid at a concentration of 0.25 g polymer per 100 mL, is obtained, an aromatic dicarboxylic acid selected from isophthalic, terephthalic and 2,6-naphtaloenedicarboxylic acids and an aromatic compound selected from 4-phenoxyphenyl sulfone, 4,4'-diphenxoybenzophenone or 4-biphenylyl sulfone in the presence of trifluoromethanesulfonic acid in an amount which is about four to nine times the theoretical weight of the polyketone or poloy(ketone-sulfone) product and an oxide of phosphorus in an amount of at least one gram-mole of —P—O—P— unit per gram-mole of carboxyl group of the reactant.

7. Process for the preparation of polyketone or poly(ketone-sulfone) containing at leat 80 mole percent of monomer segments derived from one or more aromatic dicarboxylic acids and an aromatic compound which comprises reacting at a temperature of about 10° to 40° C. until a polyketone or poly(ketone-sulfone) having an inherent viscosity of about 0.7 to 1.5, determined at 25° C. in 98% sulfuric acid at a concentration of 0.25 g polymer per 100 mL, is obtained one or more dicarboxylic acids having the formula HOOC—Ar$^1$—COOH with an aromatic compound having the formula

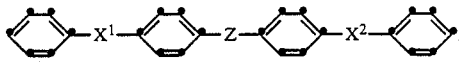

in the presence of trifluoromethanesulfonic acid in an amount Which is about four to nine times the theoretical amount of polyketone or poly(ketone-sulfone) product and perfluoroacetic or perchloroacetic anhydride in an amount of at least two gram-moles of anhydride per gram-mole of dicarboxylic acid reactant; wherein Ar$^1$ is phenylene, naphthylene or biphenylene and each —COOH is an aromatically bound carboxyl separated from the other —COOH by at least three carbon atoms, X$^1$ and X$^2$ are independently selected from a direct bond —O—, —S— or groups having the formula

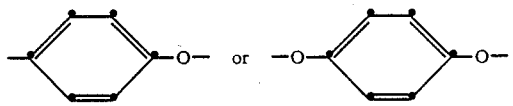

and Z is

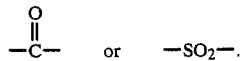

8. Process according to claim 7 wherein the polyketone or poly(ketone-sulfone) optionally contains monomer segments derived from an aromatic compound having the formula H—Ar$^1$—X$^1$—Ar$^1$—H or H—R$^1$—H wherein Ar$^1$ is defined in claim 7, H is an aromatically bound hydrogen atom and R$^1$ is the divalent residue of a polynuclear hydrocarbon containing at least 10 carbon atoms.

9. Process for the preparation of a polyketone or poly(ketone-sulfone) containing at least 75 mole percent of monomer segments from an aromatic dicarboxylic acid selected from isophthalic, terephthalic and 2,6-naphthalenedicarboxylic acids and an aromatic compound selected from 4-phenoxyphenyl sulfone, 4,4'-diphenoxybenzophenone or 4-biphenylyl sulfone which comprises reacting at a temperature of about 10° to 40° C. until a polyketone or poly(ketone-sulfone) having an inherent viscosity of about 0.7 to 1.5, determined at 25° C. in 98% sulfuric acid at a concentration of 0.25 g polymer per 100 mL, is obtained, an aromatic dicarboxylic acid selected from isophthalic, terephthalic and 2,6-naphthalenedicarboxylic acids and an, aromatic compound selected from 4-phenoxylphenyl sulfone, 4,4'-diphenoxybenzophenone or 4-biphenylyl sulfone in the presence of trifluoromethanesulfonic acid in an amount which is about four to nine times the theoretical amount of polyketone or poly(ketone-sulfone) product and perfluoroacetic or perchloroacetic anhydride in an amount of at least two gram-mole of anhyride per gram-mole of dicarboxylic acid reactant.

* * * * *